United States Patent [19]
Koz et al.

[11] Patent Number: 5,594,730
[45] Date of Patent: Jan. 14, 1997

[54] DATA DISTRIBUTION SYSTEM AND METHODS FOR ITS USE

[76] Inventors: Mark C. Koz, 2752 Glorietta Cir., Santa Clara, Calif. 95051; Masato Hata, 970 Corte Mader Ave.,#808, Sunnyvale, Calif. 94086

[21] Appl. No.: 196,203

[22] PCT Filed: Jun. 11, 1992

[86] PCT No.: PCT/US92/04944

§ 371 Date: Dec. 5, 1994

§ 102(e) Date: Dec. 5, 1994

[87] PCT Pub. No.: WO93/26095

PCT Pub. Date: Dec. 23, 1993

[51] Int. Cl.$^6$ .................................................. H04H 1/00
[52] U.S. Cl. .................... 370/488; 370/385; 370/428; 375/219; 375/240; 375/257; 348/7; 348/8; 348/384; 455/3.1
[58] Field of Search ........................ 370/85.1, 85.2, 370/110.1, 118; 455/3.1, 6.3; 375/219, 240, 257; 348/8, 384, 7, 10

[56] References Cited

U.S. PATENT DOCUMENTS

| | | | |
|---|---|---|---|
| 4,891,633 | 7/1984 | Imazeki et al. | 340/717 |
| 5,027,400 | 8/1989 | Baji et al. | 380/20 |
| 5,063,595 | 11/1991 | Ballance | 380/48 |
| 5,130,792 | 2/1990 | Tindell et al. | 358/85 |
| 5,210,741 | 5/1993 | Grochmal | 370/56 |
| 5,247,347 | 9/1993 | Litteral et al. | 348/7 |
| 5,367,330 | 11/1994 | Haave et al. | 348/7 |
| 5,390,172 | 2/1995 | Kuang | 370/60 |

*Primary Examiner*—Douglas W. Olms
*Assistant Examiner*—Russell W. Blum
*Attorney, Agent, or Firm*—Donald E. Schreiber

[57] ABSTRACT

A subscriber system (10), operating in combination with other similar subscriber systems, for collectively and swiftly distributing multiple copies of digital data to a large number of other subscriber systems. The subscriber system (10) receives digital data and stores it on a storage device (38). An autonomous digital data communication subsystem (42) then obtains a copy of the digital data directly from the storage device (30) and transmits that data to another subscriber system. The autonomous digital data communication subsystem (42) includes transceivers (72, 82, 102 or 104) for exchanging digital data with ISDN communication channels (46, 44a, 44b or 44c). The transceivers (72, 82, 102 or 104) receive the digital data from a random access memory ("RAM") (56) included in the autonomous digital data communication subsystem (42). A SCSI controller (52) exchanges the digital data between the RAM (56) and the storage device (38) of the subscriber system (10). A control signal processor controls the operation of the autonomous digital data communication subsystem (42) including its transceivers (72, 82, 102 and 104).

19 Claims, 2 Drawing Sheets

DATA DISTRIBUTION SYSTEM AND METHODS FOR ITS USE

TECHNICAL FIELD

The present invention relates generally to the technical field of electronic data transmission, especially of compressed video data and, more particularly, to a subsystem using an Integrated Services Digital Network ("ISDN") twisted pair communication channel for swiftly and cost effectively distributing digital data to a large number of subscriber systems.

BACKGROUND ART

Frequently transportation hubs such as subway platforms or train stations, etc, or commercial businesses such as banks, etc. present a video display to travelers or customers while the traveler or customer awaits service. Presently, these video display systems employ conventional video recording technology, such as video tape or video disk players, for storing and generating the video images presented on the video monitors.

To keep the programs displayed on such video monitors current and to vary the programs so travelers or customers don't become bored, programs are changed frequently, even daily. Because these video display systems employ conventional video technology for storing and generating the video images, changing the program displayed on the video monitors requires that an individual periodically visit each site and manually change a video tape or disk.

U.S. Pat. No. 5,027,400, that issued Jun. 25, 1991, on an application filed in the names of Toru Baji et al. ("the Baji et al. patent"), discloses a multimedia bidirectional broadcasting system that distributes motion picture data using a broadband ISDN communication channel. The system depicted in FIG. 3 of the Baji et al. patent, maintains a motion picture program data base at a "broadcasting station" for transmission over broadband ISDN communication channels in response to requests received at the broadcasting station from subscriber systems. The subscriber system disclosed in the Baji et al. patent includes a decoder for decoding the compressed video data and a television monitor for displaying the resulting images.

In addition to the broadcasting station disclosed in the Baji et al. patent, a PCT patent application entitled "Adaptive Video File Server and Methods for Its Use," filed Feb. 11, 1992, in the names of Mark C. Koz and Masato Hata, PCT Patent Application No. PCT/US92/01084, discloses a video file server or broadcasting station that includes both a random access data storage subsystem and an archive data storage subsystem for storing compressed video data. In response to commands from subscriber systems, the video file server of this PCT patent application transmits compressed video data to the subscriber systems over ISDN communication channels, or receives compressed video data therefrom in accordance with a variety of different image data compression standards. This first PCT patent application disclosing the video file server is incorporated herein by reference.

Another PCT patent application entitled "Adaptive Video Subscriber System and Methods for Its Use," filed Feb. 24, 1992, in the names of Mark C. Koz and Masato Hata, PCT Patent Application No. PCT/US92/01446, discloses a subscriber system that includes a communication subsystem for receiving and transmitting compressed data via an ISDN communication channel. This subscriber system generates a video signal from the compressed video data received from the ISDN communication channel to produce a visible image on a display such as a cathode ray tube ("CRT") included in a television or red-blue-green ("RGB") monitor, a liquid crystal display panel, a plasma panel, or any other suitable display device. The subscriber system disclosed in this PCT patent application also includes a SCSI controller that provides the subsystem with a SCSI port. This SCSI port permits attaching a variety of different computer peripheral devices including hard disks or an optical disk unit to the subscriber system for storing compressed video information received from the ISDN communication channel. This second PCT patent application disclosing the subscriber system is incorporated herein by reference.

Using the subscriber system disclosed in PCT Patent Application No. PCT/US92/01446 for generating video images displayed at transportation and commercial facilities instead of conventional video recording technology permits electronically distributing, over an ISDN communication channel rather than manually, the program displayed at such remote locations. Moreover, electronic program distribution to these subscriber systems can take place at convenient times of day such as when there are few or no travelers or customers present, and/or when telephone system usage is low. However, even though such a system distributes compressed video data, transmitting a new program from a central location to a subscriber system over an ISDN basic access communication channel requires a significant amount of time. For example, transmitting 10 minutes of compressed, high quality video images over a pair of ISDN basic rate communication channels takes approximately one and one-half hours.

Because a major metropolitan area may include a large number of video display installations whose programs must be changed frequently, even daily, the long transmission time to distribute compressed video data directly to subscriber systems requires a large number of broadcasting stations or video file servers. Because of their present cost, it is economically impractical to dedicate a large number of broadcasting stations or video file servers to distributing video programs over ISDN basic access communication channels when the broadcasting station or video file server may be in use for only a small portion of each day.

While using a communication channel having a higher data transmission rate than an ISDN basic access communication channel, e.g., an ISDN primary access communication channel, significantly reduces the data transmission time and therefore, correspondingly, reduces the number of broadcasting stations or video file servers required to distribute programs, the expense of such a communication channel is also be prohibitive since it will be in use for only a short interval each day.

DISCLOSURE OF INVENTION

An object of the present invention is to provide a cost effective system for electronically transmitting copies of digital data to a large number of subscriber systems in a short interval of time.

Another object of the present invention is to provide a low cost subsystem that can autonomously transmit digital data to subscriber systems.

Another object of the present invention is to provide a low cost subsystem for adapting a subscriber system to distribute digital data.

Another object of the present invention is to provide a subsystem for autonomously transmitting and/or receiving digital data.

Briefly, the present invention provides a subscriber system adapted for autonomous operation in combination with other similar subscriber systems for collectively and swiftly distributing multiple copies of digital data to a large number of other subscriber systems. Each subscriber system includes a control processor for supervising its overall operation including the operation of a communication, subsystem. The communication subsystem initially receives a copy of the digital data transmitted to the subscriber system that the subscriber system stores into a storage device, such as a hard disk. After the digital data constituting a complete program of compressed video data has been stored in the storage device, the control processor commands an autonomous digital data communication subsystem to obtain a copy of the data directly from the storage device and to transmit the digital data to another subscriber system.

In the preferred embodiment, the autonomous digital data communication subsystem includes both a random access memory ("RAM"), and a transceiver that exchanges digital data with an ISDN communication channel. When the transceiver is transmitting digital data from the autonomous digital data communication subsystem to the ISDN communication channel, the transceiver receives the digital data from the RAM. When the transceiver is receiving digital data from the ISDN communication channel, the RAM receives the digital data from the transceiver. The autonomous digital data communication subsystem also includes a control signal processor for controlling its operation, including the operation of the transceiver, and of a controller means that exchanges digital data between the RAM and the storage device of the subscriber system.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 1:
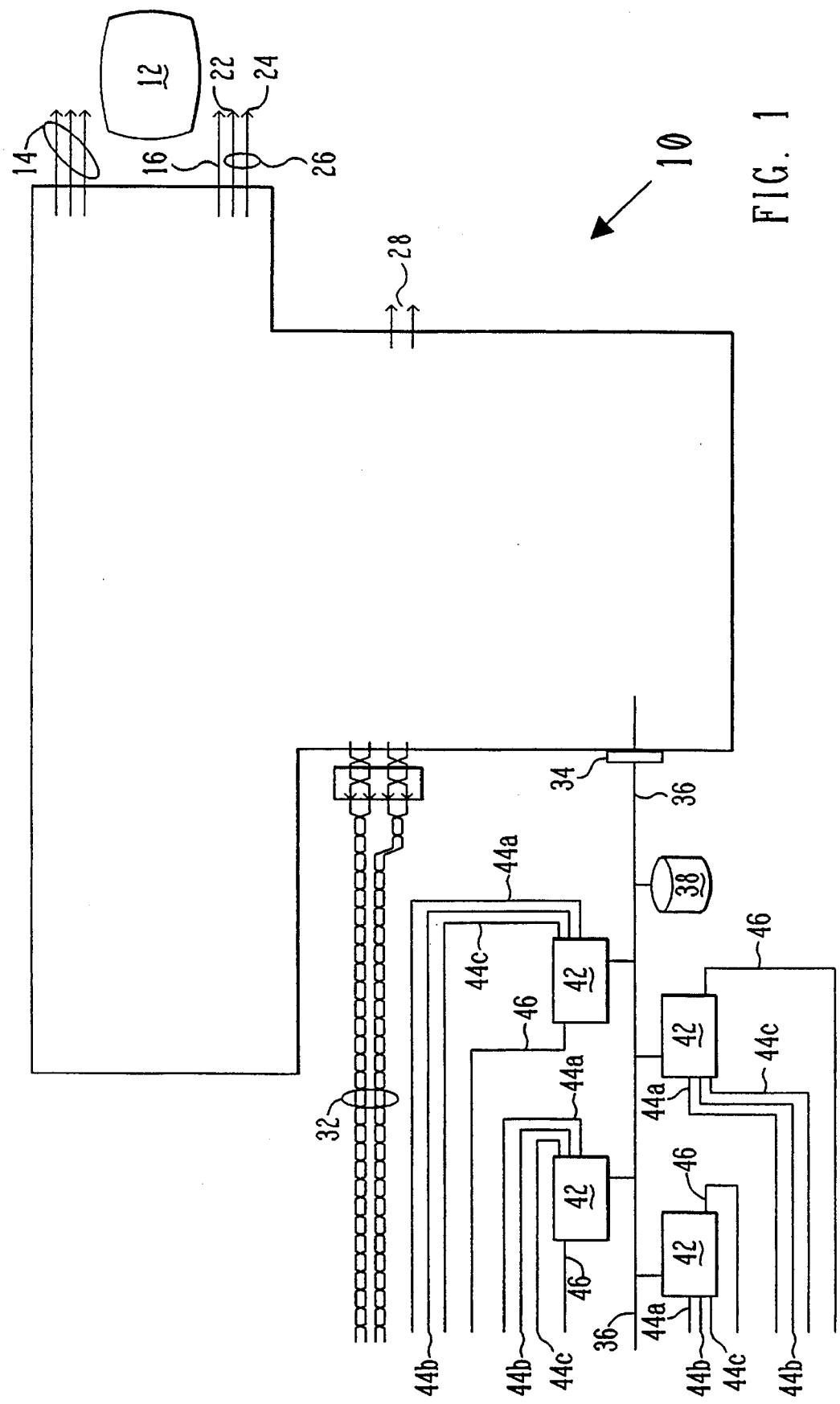
FIG. 1 is a block diagram depicting a subscriber system in accordance with the present invention including a storage device and plurality of autonomous digital data communication subsystems.

FIG. 1 depicts a subscriber system referred to by the general reference character 10 in accordance with the present invention. The subscriber system 10 is preferably of the type described in PCT Patent Application No. PCT/US92/01446 entitled "Adaptive Video Subscriber System and Methods for Its Use," filed Feb. 24, 1992, in the names of Mark C. Koz and Masato Hata, that is incorporated herein by reference.

The preferred subscriber system 10 supplies video signals to a cathode ray tube ("CRT") 12 for producing a visible image on the CRT 82, particularly in publicly accessible places such as subway platforms, train station, or commercial businesses. The video signals may be supplied as red-green-blue ("RGB") video signals via a RGB bus 14 directly to the CRT 12 included in an RGB monitor. The subscriber system 10 may also supply the video signals to the CRT 12 as a National Television Systems Committee ("NTSC") color composite video signal via a composite video signal output line 16. Alternatively, the subscriber system 10 may supply video signals to the CRT 12 via a chroma output line 22 and a luminance output line 24 of a video output signal bus 26. The subscriber system 10 also provides audio signals via an audio line-out jack 28.

The subscriber system 10 includes a communication subsystem, that is not separately illustrated in FIG. 1 but is described in PCT Patent Application No. PCT/US92/01446, for receiving compressed video signals in the form of digital data over a communication channel such as an ISDN communication channel 32. The ISDN communication channel 32 of the subscriber system 10 may be either an ISDN primary access communication channel or an ISDN basic access communication channel.

The subscriber system 10 also includes a port 34 for a Small Computer System Interface-2 ("SCSI-2") bus 36 for exchanging commands and data among a variety of different computer peripheral devices such as hard and/or floppy disks, a Digital Audio Tape ("DAT"), a CD-ROM drive, an optical disk unit, a printer, a scanner, a plotter, etc. Operating under the supervision of a control processor included in the subscriber system 10 that is not separately illustrated in FIG. 1 but is described in PCT Patent Application No. PCT/US92/01446, the subscriber system 10 may transfer compressed video signals, that it receives in the form of digital data, from the ISDN communication channel 32 to the SCSI-2 bus 36 for storage in a storage device 38, such as a hard disk or an optical disk unit.

In accordance with the present invention, the subscriber system 10 includes a plurality of autonomous digital data communication subsystems 42 that also connect to the SCSI-2 bus 36. Each autonomous digital data communication subsystem 42 operates under the supervision of the control processor included in the subscriber system 10. When the subscriber system 10 is operating autonomously for swiftly distributing multiple copies of digital data to a large number of other subscriber systems, under the supervision of the control processor each digital data communication subsystem 42 autonomously obtains a copy of the digital data directly from the storage device 38 via the SCSI-2 bus 36. After each autonomous digital data communication subsystem 42 obtains the digital data from the storage device 38, it transmits the digital data to other subscriber systems via ISDN communication channels such as ISDN basic access communication channels 44a, 44b and 44c, and/or an ISDN primary access communication channel 46 illustrated in FIG. 1.

Figure 2:
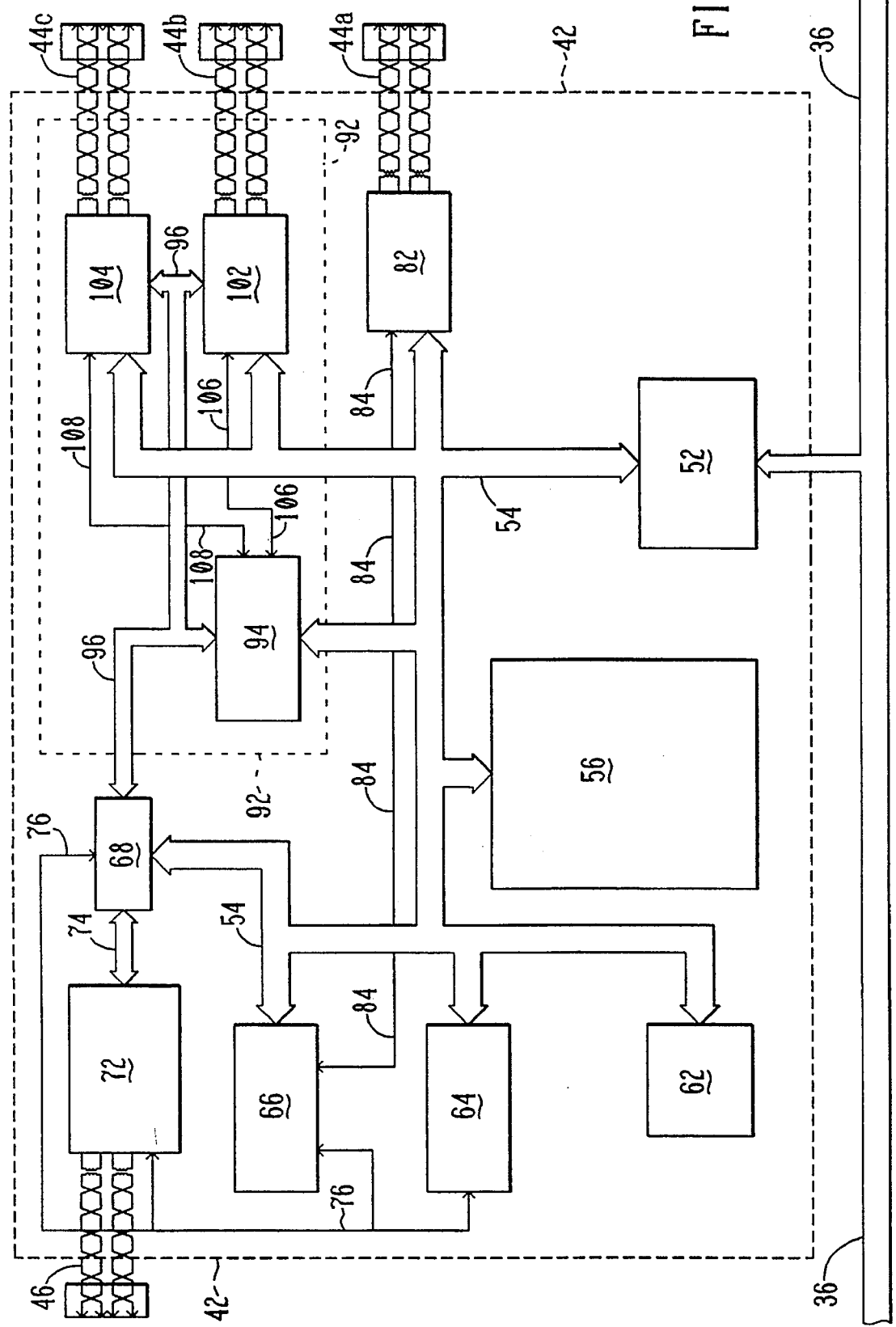
FIG. 2 is a block diagram of the autonomous digital data communication subsystem depicted in FIG. 1.

FIG. 2 is a block diagram depicting the autonomous digital data communication subsystem 42 of FIG. 1. The autonomous digital data communication subsystem 42 includes a SCSI controller 52 that may exchange both commands and digital data directly with the storage device 38 via the SCSI-2 bus 36. The SCSI controller 52 preferably is a MB86603 SCSI-2 protocol controller manufactured by Fujitsu VLSI Inc. After receiving digital data from the SCSI bus 36, the SCSI controller 52 transmits that data over an address and data bus 54 for temporary storage in a random access memory ("RAM") 56. The RAM 56 preferably includes 256 kilobytes of static RAM, one-half of which is used for program storage and the other half of which is used for data storage.

In addition to the RAM 56, the autonomous digital data communication subsystem 42 also includes a "boot" read only memory ("ROM") 62. The ROM 62 stores a computer program that is fetched and executed via the address and data bus 54 by a control signal processor 64. The ROM 62 preferably stores 256 kilobytes of computer program for execution by the control signal processor 64. The control signal processor 64 is preferably a TMS320C25 digital signal processor Integrated Circuit ("IC") that is more completely described in the "Texas Instrument DSP Handbook" and is manufactured by Texas Instruments Incorporated of Dallas, Tex. Responsive to the supervision of the control processor for the subscriber system 10, the computer program executed by the control signal processor 64 controls the overall operation of the autonomous digital data communication subsystem 42.

To effect the overall operation of the autonomous digital data communication subsystem 42 in transmitting digital data received from the SCSI-2 bus 36 to the ISDN basic access communication channels 44a and to the ISDN primary access communication channel 46, the control signal processor 64 transmits control signals via the address and data bus 54 to a first serial controller 66, and to a Programmable Array Logic Integrated Circuit ("PAL") 68. The first serial controller 66 is preferably an AM82525 Serial Controller manufactured both by Siemens Integrated Circuit Division of Santa Clara, Calif. The PAL 68 is preferably a MACH 110 manufactured by Advanced Micro Devices Inc. of Sunnyvale, Calif..

The PAL 68 exchanges control and data signals with a primary rate transceiver 72 via an ISDN primary rate data bus 74. The primary rate transceiver 72 is preferably a Dallas Semiconductor DS2280 T1 Line Card Stik™. The Dallas DS2280, more completely described in a "Dallas Semiconductor Handbook," is manufactured by Dallas Semiconductor of Dallas, Tex. The PAL 68 adapts signals on the address and data bus 54 and the primary rate bus 74 so the primary rate transceiver 72 may exchange signals with other ICs such as the control signal processor 64 and the RAM 56. Operating under the control of the computer program executed by the control signal processor 64, the primary rate transceiver 72 may either receive digital data from or transmit digital data to the ISDN primary access communication channel 46. When transmitting digital data to the ISDN primary access communication channel 46, the primary rate transceiver 72 receives the digital data from the RAM 56 via the address and data bus 54, the PAL 68 and the primary rate bus 74. When receiving digital data from the ISDN primary access communication channel 46, the primary rate transceiver 72 transmits serial data to the control signal processor 64, to the first serial controller 66, and to the PAL 68 via a PCM bus 76.

In addition to receiving serial data from the primary rate transceiver 72 via the PCM bus 76, the first serial controller 66 also receives serial data from a basic rate transceiver 82 over a multiplexed serial bus 84. The basic rate transceiver 82, which also connects to the address and data bus 54, operates under the control of the control signal processor 64 for exchanging digital data with the ISDN basic access communication channel 44a. When the first basic rate transceiver 82 transmits digital data to the ISDN basic access communication channel 44a, it receives the data directly from the RAM 56 via the address and data bus 54. When the first basic rate transceiver 82 receives digital data from the ISDN basic access communication channel 44a, it transmits serial data to the first serial controller 66 via the first multiplexed serial bus 84. The first serial controller 66 receives serial data from the primary rate transceiver 72 and/or from the first basic rate transceiver 82, organizes it into 16 bit words, and stores those words directly into the RAM 56 via the address and data bus 54.

As described thus far, the autonomous digital data communication subsystem 42 is capable of exchanging digital data with either the ISDN basic access communication channel 44a or with the ISDN primary access communication channel 46; or simultaneously with both the channels 44a and 46. However, the preferred embodiment of the autonomous digital data communication subsystem 42 may also incorporate an optional "daughter board" 92, that is depicted within a dashed line in FIG. 2. The daughter board 92 includes a second serial controller 94, that is preferably an AM82525 Serial Controller of the type characterized more completely above. The second serial controller 94 connects to the address and data bus 54, and to a daughter board bus 96. The daughter board bus 96 interconnects the second serial controller 94 with the PAL 68, and with both a second basic rate transceiver 102 and a third basic rate transceiver 104. The basic rate transceivers 102 both connect to the address and data bus 54, and respectively to a second multiplexed serial bus 106 and a third multiplexed serial bus 108 that respectively interconnect the basic rate transceivers 102 and 104 with the second serial controller 94. Both the second serial controller 94 and the basic rate transceivers 102 and 104 receive control signals from the PAL 68 via the daughter board bus 96.

Similar to the first basic rate transceiver 82, the second and third basic rate transceivers 102 and 104 operate under the control of the control signal processor 64 for exchanging digital data respectively with the ISDN basic access communication channels 44b and 44c. When the basic rate transceivers 102 and 104 respectively transmit digital data to the ISDN basic access communication channel 44a, they receive the data directly from the RAM 56 via the address and data bus 54. When the basic rate transceivers 102 and 104 receive digital data from the ISDN basic access communication channel 44a, they respectively transmits serial data to the second serial controller 94 via the first multiplexed serial bus 84. Similar to the first serial controller 66, the second serial controller 94 receives serial data from the basic rate transceivers 102 and/or 104, organizes it into 16 bit words, and stores those words directly into the RAM 56 via the address and data bus 54.

Digital Data Distribution

The subscriber system 10 described above is particularly useful for distributing multiple copies of digital data to a large number of other subscriber systems in the following way. A broadcasting station, such as that described in the Baji et al. patent, or a video file server, such as that described in PCT patent application PCT/US92/01084, transmits a program consisting of compressed, high quality video images first to a single subscriber system 10 over a pair of ISDN basic access communication channels. As the subscriber system 10 receives this digital data, the data is transmitted over the SCSI-2 bus 36 for storage on the storage device 38. After approximately one and one-half hours, the subscriber system 10 will store on the storage device 38 approximately 10 minutes of program for repeated presentation on its CRT 12.

However, in addition to displaying the program now stored on the storage device 38 on the CRT 12, the control processor of the subscriber system 10 orders each of the autonomous digital data communication subsystems 42 to begin autonomously obtaining a copy of the digital data from the storage device 38 and transmitting that digital data to other subscriber systems. In ordering each autonomous digital data communication subsystem 42 to obtain and transmit the digital data, the control processor of the subscriber system 10 may provide each communication subsystem 42 with data specifying the telephone numbers of other subscriber systems to which the digital data will be transmitted, or such dialing information could be included in the data which the communication subsystem 42 obtains from the storage device 38.

Upon being ordered to obtain a copy of the digital data from the storage device 38, the control signal processor 64 in the autonomous digital data communication subsystem 42 commands the SCSI controller 52 to begin obtaining the digital data directly from the storage device 38 via their shared SCSI-2 bus 36. As the SCSI controller 52 receives the digital data from the storage device 38, it stores the data directly into the RAM 56 that is shared among all the transceivers 72, 82, 102 and 104. Thereafter, under the control of the control signal processor 64, the digital data is transferred over the address and data bus 54 to any combination of the transceivers 72, 82, 102 and 104 for transmission to other subscriber systems respectively over the ISDN communication channels 46, 44a, 44b and/or 44c.

While the subscriber system 10 illustrated in FIG. 1 includes only four autonomous digital data communication subsystems 42, each subscriber system 10 may practically include at least eight communication subsystems 42, and could actually include as many as fourteen communication subsystems 42. Thus, for example, if eight autonomous digital data communication subsystems 42 were included in the subscriber system 10, and if each such communication subsystem 42 were to transmit the digital data to other subscriber systems only over its three ISDN basic access communication channels 44a, 44b and 44c, approximately three hours after the broadcasting station or video file server began transmitting the compressed video data to the subscriber system 10, the single digital data initially transmitted to only the subscriber system 10 is now distributed to at least twenty-five subscriber systems, i.e., the original subscriber system 10 plus twenty-four other subscriber systems (three subscriber systems for each of the eight autonomous digital data communication subsystems 42).

Repeating the process described above once again only this time with each of the twenty-five subscriber systems that now have copies of the program stored on their storage devices 38 transmitting the digital data to another twenty-four subscribers distributes the program to an additional six-hundred subscriber systems within approximately four and one-half hours after the broadcasting station or video file server first began transmitting the compressed video data to the first subscriber system 10. A third iteration of this process with each of the six-hundred and twenty-five subscriber systems transmitting the digital data to twenty-four other subscriber systems distributes the program to as many as 15,625 subscriber systems within approximately six hours after the broadcasting station or video file server first began transmitting the compressed video data to the first subscriber system 10.

Thus, the addition of autonomous digital data communication subsystems 42 into the subscriber system 10 disclosed in PCT patent application PCT/US92/01446 permits the distribution of multiple copies of digital data to a large number of subscriber systems within a practical amount of time, e.g. approximately six hours. Moreover, the preceding example of the distribution of the same digital data to 15,625 subscriber systems within approximately six hours illustrates only a fraction of the capability of subscriber systems, such as the subscriber system 10 disclosed herein, to collectively distribute digital data using the autonomous digital data communication subsystem 42.

The capability of each subscriber system 10 to distribute digital data can be modestly increased by also transmitting a copy of the data over the ISDN communication channel 32 included in each subscriber system 10. If the ISDN communication channel 32 of each subscriber system 10 were also used for distributing the digital data, after approximately six hours the digital data would be distributed to 17,576 rather than to only 15,625 subscriber systems. It is readily apparent that using an ISDN primary access communication channel 46 to distribute the digital data would even more markedly increase the speed of data distribution.

However, an even more dramatic increase in the capability for distributing digital data can be obtained if the subscriber system 10 orders each of the autonomous digital data communication subsystems 42 to begin autonomously obtaining a copy of the digital data and transmitting it while the subscriber system 10 is still receiving the data and before it has stored all of the data on the storage device 38. If the subscriber system 10 were to order its autonomous digital data communication subsystems 42 to commence distributing the digital data after receiving only one-sixth of the data, then the data could be distributed to 15,625 subscriber systems in only one and one-half of the time required to transmit the data from the broadcasting station or video file server to the first subscriber system 10. In the example set forth above, rather than taking approximately six hours to distribute the digital data to 15,625 subscriber systems, by beginning to distribute the data after receiving only one-sixth of it all 15,625 subscriber systems will complete their reception of the data in approximately two and one-quarter hours. Alternatively, after six hours of such progressive distribution, the digital data could be distributed to $25^{18}$ subscriber systems, a number of subscriber systems so large as to be far beyond any possible practical realization.

Industrial Applicability

While thus far the utility of the autonomous digital data communication subsystem 42 has been described in the context of swiftly distributing multiple copies of compressed video data to a large number of subscriber systems, the autonomous digital data communication subsystem 42 may also be effectively applied in distributing copies of different digital data to a large number of subscriber systems. Since the autonomous digital data communication subsystem 42 exchanges digital data with the SCSI-2 bus 36, it can be used with any digital computer system that provides a SCSI-2 bus. If, for example, a database were maintained on such a computer and only selected portions of the database need be distributed to specified remote sites, then each of the autonomous digital data communication subsystems 42 could be ordered to transmit only selected portions of the database to up to eight remote sites. For example, if the centralized database maintained an inventory of items in stock at various company locations, then the autonomous digital data communication subsystems 42 could be effectively used in providing local inventory information to each individual company location.

Similarly, while the autonomous digital data communication subsystem 42 has been described thus far in the context of distributing digital data to a large number of subscriber systems, it could also be effectively employed for autonomously collecting data from a large number of different locations, and storing such data into a database on the storage device 38. After the data received by the transceivers 72, 82, 102 and/or 104 has been stored in the RAM 56 as described above, the control signal processor 64 of the autonomous digital data communication subsystem 42 may order the SCSI controller 52 to store the data into the storage device 38 via the SCSI-2 bus 36.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A subscriber system adapted for autonomous operation in combination with other similar subscriber systems for collectively and swiftly distributing multiple copies of digital data respectively to a large number of other subscriber systems, each subscriber system comprising:

a control processor for controlling overall operation of said subscriber system;

a communication subsystem operating under the supervision of said control processor for receiving a copy of the digital data transmitted to said subscriber system;

a storage device operating under the supervision of said control processor for storing the copy of the digital data received by said communication subsystem; and an autonomous digital data communication subsystem operating under the supervision of said control processor for autonomously obtaining a copy of the digital data directly from said storage device and transmitting the digital data to another subscriber system.

2. The subscriber system of claim 1 wherein said autonomous digital data communication subsystem concurrently transmits a copy of the data to several different subscriber systems.

3. The subscriber system of claim 1 adapted for individually transmitting multiple copies of digital data respectively to a large number of other subscriber systems, said subscriber system further comprising:

a plurality of autonomous digital data communication subsystems, each autonomous digital data communication subsystem operating under the supervision of said control processor for autonomously obtaining a copy of the digital data directly from said storage device and transmitting the digital data to another subscriber system, all of said autonomous digital data communication subsystems included in said subscriber system concurrently obtaining and transmitting the digital data, whereby said autonomous digital data communication subsystems concurrently transmit the digital data to a plurality of other subscriber systems.

4. The subscriber system of claim 3 wherein each autonomous digital data communication subsystem concurrently transmits a copy of the data to several different subscriber systems.

5. The subscriber system of claim 1 wherein each autonomous digital data communication subsystem comprises:

a transceiver for exchanging digital data with an ISDN communication channel;

a random access memory ("RAM") from which said transceiver receives digital data when said transceiver is transmitting such data to an ISDN communication channel, or which receives digital data from said transceiver when said transceiver is receiving such data from an ISDN communication channel;

a control signal processor for controlling the operation of said autonomous digital data communication subsystem including said transceiver; and controller means, operating under the control of said control signal processor, for exchanging digital data between said RAM and said storage device.

6. The subscriber system of claim 5 wherein said autonomous digital data communication subsystem is adapted for concurrently exchanging digital data with a plurality of remote locations, said autonomous digital data communication subsystem comprising:

a plurality of transceivers, each transceiver autonomously exchanging digital data with an ISDN communication channel, each transceiver when transmitting digital data to an ISDN communication channel autonomously fetching such data from the RAM, and each transceiver when receiving digital data from an ISDN communication channel autonomously storing such data into the RAM.

7. The subscriber system of claim 6 wherein at least one of said transceivers of said autonomous digital data communication subsystem exchanges digital data with a basic access ISDN communication channel and another of said transceivers exchanges digital data with a primary access ISDN communication channel.

8. The subscriber system of claim 6 wherein said controller means of said autonomous digital data communication subsystem exchanges both commands and digital data directly with said storage device via a shared bus.

9. The subscriber system of claim 6 wherein the digital data is compressed video data, said subscriber system further comprises a visual display means for presenting an image of the digital data.

10. The subscriber system of claim 1 wherein said autonomous digital data communication subsystem comprises:

a transceiver for exchanging digital data with an ISDN communication channel;

a random access memory ("RAM") from which said transceiver receives digital data when said transceiver is transmitting such data to an ISDN communication channel, or which receives digital data from said transceiver when said transceiver is receiving such data from an ISDN communication channel;

a control signal processor for controlling the operation of said autonomous digital data communication subsystem including said transceiver; and controller means, operating under the control of said control signal processor, for exchanging digital data between said RAM and said storage device.

11. The subscriber system of claim 10 wherein said autonomous digital data communication subsystem is adapted for concurrently exchanging digital data with a plurality of remote locations, said autonomous digital data communication subsystem comprising:

a plurality of transceivers, each transceiver autonomously exchanging digital data with an ISDN communication channel, each transceiver when transmitting digital data to an ISDN communication channel autonomously fetching such data from the RAM, and each transceiver when receiving digital data from an ISDN communication channel autonomously storing such data into the RAM.

12. The subscriber system of claim 11 wherein at least one of said transceivers of said autonomous digital data communication subsystem exchanges digital data with a basic access ISDN communication channel and another of said transceivers exchanges digital data with a primary access ISDN communication channel.

13. The subscriber system of claim 11 wherein said controller means of said autonomous digital data communication subsystem exchanges both commands and digital data directly with said storage device via a shared bus.

14. The subscriber system of claim 11 wherein the digital data is compressed video data, said subscriber system further comprises a visual display means for presenting an image of the digital data.

15. The subscriber system of claim 1 wherein the digital data is compressed video data, said subscriber system further comprises a visual display means for presenting an image of the digital data.

16. An autonomous digital data communication subsystem for concurrently exchanging digital data with a plurality of remote locations, said autonomous digital data communication subsystem comprising:

a plurality of transceivers, each transceiver autonomously exchanging digital data with an ISDN communication channel;

a RAM from which each transceiver autonomously receives digital data when said transceiver is transmitting such data to an ISDN communication channel, or which receives digital data from each transceiver autonomously when said transceiver is receiving such data from an ISDN communication channel;

a control signal processor for controlling the operation of said autonomous digital data communication subsystem including said transceivers; and controller means, operating under the control of said control signal processor, for exchanging digital data between said RAM and a storage device.

17. The autonomous digital data communication subsystem of claim 16 wherein at least one of the transceivers exchanges digital data with a basic access ISDN communication channel and another of the transceivers exchanges digital data with a primary access ISDN communication channel.

18. The autonomous digital data communication subsystem of claim 16 wherein said controller means exchanges both commands and digital data directly with the storage device via a shared bus.

19. The autonomous digital data communication subsystem of claim 16 wherein said controller means exchanges both commands and digital data directly with the storage device via a shared bus.

\* \* \* \* \*